Patented Mar. 16, 1954

2,672,464

UNITED STATES PATENT OFFICE 2,672,464

ANTHRAQUINONES

Victor S. Salvin, Irvington, and Edward F. Landau, South Orange, N. J., assignors to Celanese Corporation of America, New York, N. Y., a corporation of Delaware No Drawing. Application October 25, 1951, Serial No. 253,208

9 Claims. (Cl. 260—380)

This invention relates to anthraquinones and relates more particularly to the preparation of novel anthraquinones containing a hydroxyalkylthio group in the beta position.

This application is a continuation-in-part of application S. No. 105,893, filed July 20, 1949, now abandoned.

In the dyeing of cellulose acetate and other organic derivative of cellulose materials, it is common to employ dyebaths containing a mixture of dyestuffs to obtain dyeings in the desired colors and shades. One of the major problems in the preparation of such dyebaths is the difficulty in obtaining dyestuffs with similar dyeing properties. If there are employed dyebaths that contain a mixture of dyestuffs that do not have similar dyeing properties, minor variations in the composition of the dyebath may produce marked differences in the color or the shade of materials dyed therewith, which is objectionable from a commercial point of view. For example, certain dyestuffs are highly sensitive to the detergents normally contained in dyebaths and, as the concentration of the detergents varies, the shade of the dyeings obtained with said dyestuffs fluctuates over a wide range. Other dyestuffs are less sensitive to the detergents contained in dyebaths and show a smaller fluctuation in shade as the concentration of the detergent varies. When dyestuffs of both types are mixed in a dyebath, any variation in the concentration of the detergent will cause a change in the color or the shade of the materials dyed therewith since the dyes will be affected in an unequal manner. As a result many dyestuffs, which are otherwise entirely suited for the dyeing of cellulose acetate and other organic derivative of cellulose materials, require the taking of special precautionary measures in order that there may be obtained uniform dyeings from dyebaths containing the same.

It is an important objection of this invention to provide novel anthraquinone dyestuffs which will be free from the foregoing and other disadvantages of prior dyestuffs.

A further object of this invention is the provision of certain novel anthraquinones containing hydroxyalkylthio groups in the beta position, which are not sensitive to the concentration of detergent in a dyebath and which will dye cellulose acetate and other organic derivative of cellulose materials in valuable blue shades.

Another object of this invention is the provision of a novel process for introducing a hydroxyalkylthio group into the beta position of an anthraquinone nucleus.

Other objects of this invention will be apparent from the following detailed description and claims.

We have now discovered that the isomeric dyestuffs of the following general formulae:

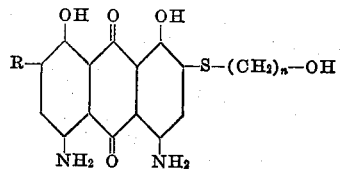

and

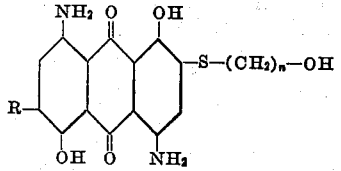

wherein R is H or —S—(CH$_2$)$_n$—OH and $n$ is an integer, exhibit substantially no sensitivity to the concentration of detergent in a dyebath and will dye cellulose acetate and other organic derivative of cellulose materials in valuable blue shades, which are of excellent resistance to light, washing and acid-fading. Because the novel dyestuffs of our invention are not sensitive to the concentration of detergents, dyebaths containing the same yield more uniform and more level dyeings than dyebaths containing prior commercial blue dyestuffs. In addition, our novel dyestuffs have a greater intrinsic color value and may be employed in lower concentrations than said prior commercial blue dyestuffs. These properties are of particular importance when the novel dyestuffs of our invention are employed in dyebaths containing a mixture of dyestuffs, since it permits said dyebaths to be readily controlled to yield dyeings that are reproducible both as to color and shade.

The dyestuffs of our invention may be prepared by a single stage process in which an anthraquinone of the following general formulae:

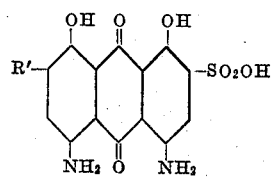

and

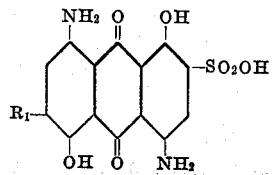

wherein $R_1$ is H or $SO_2OH$ is reacted in an alkaline medium with a mercapto alkyl alcohol. Suitable mercapto alkyl alcohols are, for example, 2-mercapto ethanol, 3-mercapto-1-propanol and 4-mercapto-1-butanol, which will yield the dyestuffs 1,5-dihydroxy-2-hydroxyethylthio-4,8-diamino-anthraquinone, 1,5-dihydroxy-2,6-di-hydroxyethylthio-4,8-diamino-anthraquinone, 1,5-dihydroxy-2-hydroxpropylthio-4,8-diamino-anthraquinone, 1,5-dihydroxy-2,6-dihydroxypropylthio-4,8-diamino-anthraquinone, 1,5-dihydroxy-2-hydroxybutylthio-4,8-diamino-anthraquinone, 1,5-dihydroxy-2,6-di-hydroxybutylthio-4,8-diamino-anthraquinone, and the corresponding 1,8-dihydroxy-4,5-diamino anthraquinones. The reaction medium may be rendered alkaline by any suitable alkaline agent such as, for example, sodium hydroxide or potassium hydroxide.

In carrying out this reaction, from about 1 to 5 mols of the mercapto alkyl alcohol, for each sulfonic acid group it is desired to replace, are mixed with one mol of an anthraquinone-β-sulfonic acid and a suitable alkaline agent, and the mixture so formed maintained at an elevated temperature of from about 90 to 105° C. until the reaction is complete, say for about 3.5 to 8 hours.

The following examples are given to illustrate this invention further.

*Example I*

A mixture of 120 parts by weight of 1,5-dihydroxy-2-sulfonic acid-4,8-diamino-anthraquinone of 33% strength, 46 parts by weight of 2-mercapto ethanol, 50 parts by weight of a 50% aqueous sodium hydroxide solution, and 2000 parts by weight of water are entered into a reaction vessel equipped with a stirrer and a reflux condenser. The mixture is heated to reflux (100–105° C.) with stirring for 5 hours following which it is cooled and filtered. There are obtained 48 parts by weight of 80% strength or 90% of theoretical of the dyestuff 1,5-dihydroxy-2-hydroxyethylthio-4,8-diamino-anthraquinone.

*Example II*

A dyebath is prepared by dispersing 0.1 part by weight of the dyestuff of Example I in an aqueous bath containing 750 parts by weight of water, 0.075 part by weight of green soap, 1.5 parts by weight of Turkey red oil and 0.375 part by weight of potassium pyrophosphate. Cellulose acetate fabrics, when dyed in this dyebath for 1 hour at a temperature of 80° C., exhibit a blue shade of excellent resistance to light, washing and acid fading.

*Example III*

A dyebath is prepared by dispersing 0.1 part by weight of the dyestuff of Example I in an aqueous bath containing 750 parts by weight of water, 3.75 parts by weight of green soap, 1.5 parts by weight of Turkey red oil and 0.375 part by weight of potassium pyrophosphate. Cellulose acetate fabrics, when dyed in this dyebath for 1 hour at a temperature of 80° C., exhibit a blue shade substantially identical to that obtained when the dyebath of Example II is employed although the concentration of green soap is increased fiftyfold. Other commercial dyestuffs when dyed under conditions identical to those set forth in Examples II and III exhibit a marked variation in shade as the concentration of green soap is varied.

While our invention has been described more particularly in connection with the dyeing of cellulose acetate materials, other organic derivative of cellulose materials may also be dyed with our dyestuffs. Examples of such materials are cellulose esters such as cellulose acetate, cellulose propionate, cellulose butyrate, cellulose acetate-propionate and cellulose acetate-butyrate and cellulose ethers such as ethyl cellulose. The dyestuffs of our invention may also be employed for the dyeing of other materials such as polycarboxyamides and polyurethanes.

It is to be understood that the foregoing detailed description is given merely by way of illustration and that many variations may be made therein without departing from the spirit of our invention.

Having described our invention, what we desire to secure by Letters Patent is:

1. Anthraquinone dyestuffs of the group consisting of

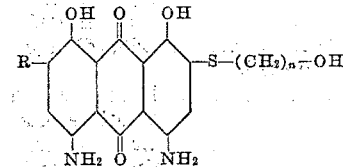

and

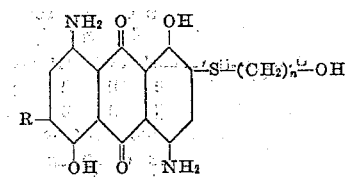

wherein R is a member of the group consisting of H and $-S-(CH_2)_n-OH$ and $n$ is a positive integer.

2. The anthraquinone dyestuff 1,5-dihydroxy-2-hydroxyethylthio-4,8-diamino anthraquinone.

3. Process for preparing anthraquinones having a hydroxyalkylthio substituent, which comprises reacting a mercapto alkyl alcohol with an anthraquinone of the group consisting of

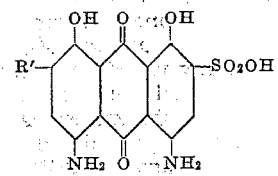

and

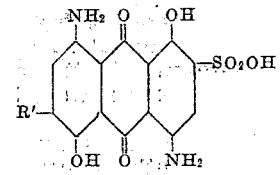

wherein $R_1$ is a member of the group consisting of H and $SO_2OH$.

4. Process for preparing anthraquinones having a hydroxyalkylthio substituent which comprises reacting from about 1 to 5 mols of a mercapto alkyl alcohol for each sulfonic acid group with one mol of an anthraquinone of the group consisting of

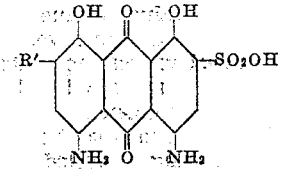

and

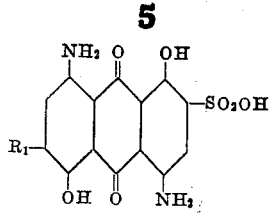

wherein R₁ is a member of the group consisting of H and SO₂OH.

5. Process for preparing anthraquinones having a hydroxyalkylthio substituent which comprises reacting from about 1 to 5 mols of a mercapto alkyl alcohol for each sulfonic acid group with one mol of an anthraquinone of the group consisting of

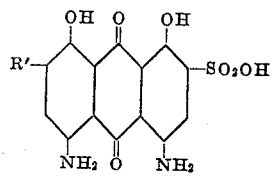

and

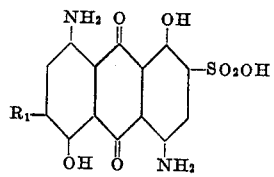

wherein R₁ is a member of the group consisting of H and SO₂OH at a temperature of from about 90 to 105° C.

6. Process for preparing anthraquinones having a hydroxyalkylthio substituent which comprises reacting from about 1 to 5 mols of a mercapto alkyl alcohol of each sulfonic acid group with one mol of an anthraquinone of the group consisting of

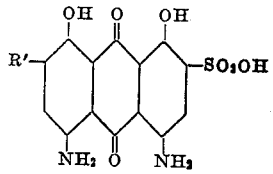

and

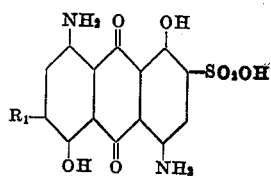

wherein R₁ is a member of the group consisting of H and SO₂OH at a temperature of from about 90 to 105° C. for about 3.5 to 8 hours.

7. Process for preparing anthraquinones having a hydroxyalkylthio substituent which comprises reacting from about 1 to 5 mols of a mercapto alkyl alcohol for each sulfonic acid group with one mol of an anthraquinone of the group consisting of

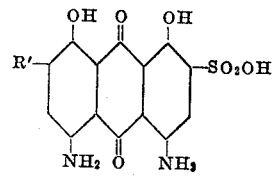

and

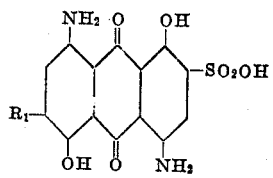

wherein R₁ is a member of the group consisting of H and SO₂OH at a temperature of from about 90 to 105° C. for about 3.5 to 8 hours in the presence of an alkaline agent.

8. Process for preparing anthraquinones having a hydroxyalkylthio substituent which comprises reacting 2-mercapto-ethanol with 1,5-dihydroxy-2-sulfonic acid-4,8-diamino-anthraquinone.

9. Process for preparing anthraquinones having a hydroxyalkylthio substituent which comprises reacting 46 parts by weight of 2-mercapto ethanol with 120 parts by weight of 1,5-dihydroxy-2-sulfonic acid-4,8-diamino anthraquinone at a temperature of 100–150° C. for about 5 hours in the presence of 50 parts by weight of a 50% aqueous sodium hydroxide solution.

VICTOR S. SALVIN.
EDWARD F. LANDAU.

References Cited in the file of this patent

UNITED STATES PATENTS

| Number | Name | Date |
|---|---|---|
| 2,117,569 | Peter | May 17, 1938 |
| 2,434,765 | Grossmann | Jan. 20, 1948 |
| 2,441,355 | Grossmann | May 11, 1948 |
| 2,485,197 | Grossmann | Oct. 18, 1949 |

OTHER REFERENCES

Beilstein: vol. 14, 4th ed., pages 873–874, 1931.